Patented Mar. 2, 1926.

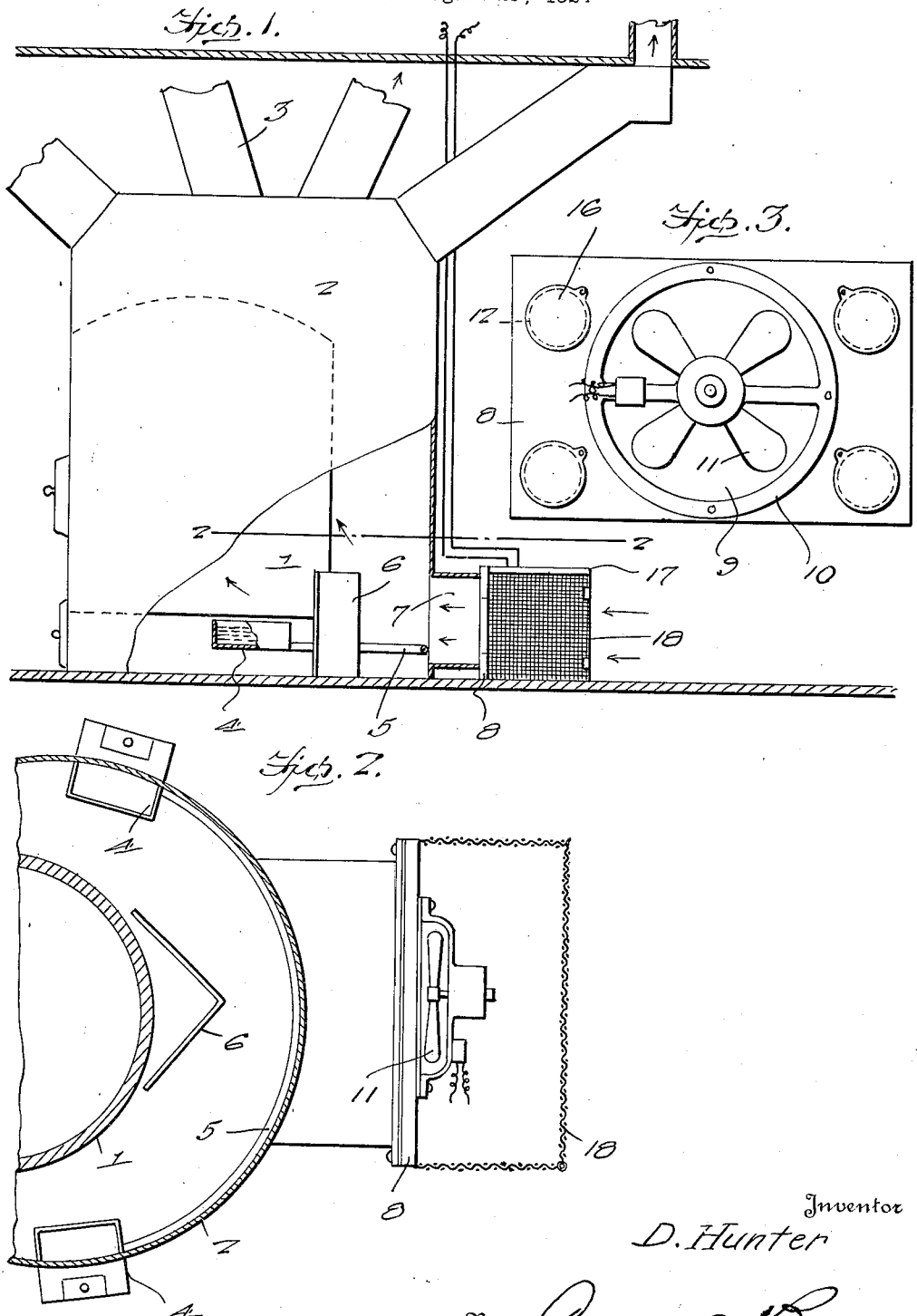

1,574,892

UNITED STATES PATENT OFFICE.

DAVID HUNTER, OF NEW ORLEANS, LOUISIANA.

INDUCTION HEATING AND VENTILATING SYSTEM.

Application filed August 29, 1924. Serial No. 734,909.

*To all whom it may concern:*

Be it known that I, DAVID HUNTER, a citizen of the United States, residing at New Orleans, in the parish of Orleans and State of Louisiana, have invented certain new and useful Improvements in an Induction Heating and Ventilating System, of which the following is a specification.

This invention relates to an induction heating and ventilating system especially adapted to be used in dwellings occupied for domestic purposes and it consists in the novel features hereinafter described and claimed.

An object of the invention is to provide such a system which may be installed in conjunction with a hot air furnace of conventional form and which system includes an exhaust fan adapted to direct a blast of air toward a blast spreader which is located at the side of the furnace and in the vicinity of the base thereof. The said fan is enclosed in a casing of especial design and air ports are provided at the sides of the fan and passageways through the ports are controlled by suitable valves. Moistening means are provided for dampening the branches of the blast of air substantially at the time that the said blasts are brought in contact with the furnace and are heated and consequently the heated air in a proper moist condition is supplied to the rooms or compartments of the dwelling.

Hot air furnaces as usually operated are objectionable for the reason that they deprive the air of its constituent moisture and consequently the air is devitalized or burnt and such burning results from the slow rate of speed at which the air is moved over the furnace during the process of heating. Under usual conditions the air is generally moved over the furnace at the rate of approximately two or three hundred feet per minute. By the use of the present system, the air is moved over the furnace approximately at a rate of from six hundred to fourteen hundred feet per minute depending upon the speed at which the fan is driven. By this arrangement and as a result of this process the air does not remain in contact with the furnace for a sufficient length of time to burn the hydrogen out and consequently the air is not devitalized or deprived of its proper amount of moisture. Any moisture that may be removed from the air is replenished by the moistening devices with which the system is provided.

In the accompanying drawing:—

Figure 1 is a side elevation of a furnace casing with parts in section and showing the fan casing applied thereto.

Figure 2 is a horizontal sectional view of the same cut on the line 2—2 of Figure 1.

Figure 3 is an elevation of a fan and the fan supporting means.

As shown in the accompanying drawing, the heating and ventilating system comprises a furnace 1 about which is disposed a casing 2 in a usual manner. The casing 2 is provided with a series of hot air distributing pipes 3. Water trays 4 are provided at the lower portion of the casing and are connected together by means of a pipe 5 which extends partially around the inner surface of the said casing and which communicates at its ends with the said trays at the opposite side portions of the casing. An angular deflector plate 6 is mounted within the casing 2 and at the side of the furnace and the base thereof and opposite the air inlet passageway 7 provided at the lower portion of the casing.

The outer end of the passageway 7 is closed by a plate 8 which is provided at its center with a relatively large opening 9 about which is supported a spider 10 carrying an electric fan 11. The fan, when in operation, is adapted to discharge a blast of air through the passageway 7 and against the angular plate 6 whereby the said blast is split or divided into streams which are directed around the interior of the casing and against the exterior of the furnace 1 and which eventually make their exit from the casing 2 through the distributing pipes 3. The plate 8 is further provided in the vicinity of its corners with relatively small openings 12 which may be closed by shutters 16 pivotally mounted upon the plate 8 in the vicinity of the said openings 12. A casing is disposed over the fan 11 and spider 10 and includes an imperforated top board 17 and perforated side walls 18 preferably formed of wire gauze.

When the arrangement as above described is in operation, the fan 11 is rotated whereby the air is drawn under the top 17 of the casing though the opening in the side wall 18 and is directed by the fan blades through the passageway 7 against the deflector plate 6. The branches of the blast of air come in contact with the furnace and are heated at the same time that the said branches of the blast of air absorb moisture from the trays 4 and consequently the moisture which is evaporated by the furnace is replenished from the trays and the air is retained in a proper moist condition. This moistened heated air is distributed through the pipes 3 through the rooms of the dwelling in the usual manner.

Having thus described the invention, what I claim is:—

A heating and ventilating system including a heating device, a casing disposed thereover, said casing being provided with an air passageway, an angular plate located within the casing and disposed between the heating device and the air passageway, air moistening elements located in the casing each a distance at each side from the angular plate and each disposed at each side of the heating device, and a fan located at the intake end of the passageway and adapted to direct a blast of air through the passageway for engagement with the angular plate and deflection toward the air moistening elements.

In testimony whereof I affix my signature.

DAVID HUNTER.